United States Patent
Thies et al.

(10) Patent No.: US 12,145,126 B2
(45) Date of Patent: Nov. 19, 2024

(54) UNIT AND METHOD FOR PRODUCING AND TREATING GRANULATE, AND ADAPTER CONNECTION PIECE FOR CONNECTING A GRANULATOR WHICH GENERATES A GRANULATE AND A FLUIDIZING APPARATUS

(71) Applicant: Glatt Gesellschaft mit beschränkter Haftung, Binzen (DE)

(72) Inventors: Jochen Thies, Loerrach (DE); Dirk Zimmermann, Wehr (DE); Xaver Knöpfle, Neuenburg (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 1013 days.

(21) Appl. No.: 16/972,098

(22) PCT Filed: May 20, 2019

(86) PCT No.: PCT/EP2019/062946
§ 371 (c)(1),
(2) Date: Dec. 4, 2020

(87) PCT Pub. No.: WO2019/233746
PCT Pub. Date: Dec. 12, 2019

(65) Prior Publication Data
US 2021/0220786 A1    Jul. 22, 2021

(30) Foreign Application Priority Data
Jun. 6, 2018 (DE) .................... 10 2018 208 930.2

(51) Int. Cl.
*B01J 2/16* (2006.01)
*B01J 2/20* (2006.01)

(52) U.S. Cl.
CPC . *B01J 2/16* (2013.01); *B01J 2/20* (2013.01); *B01J 2208/0084* (2013.01)

(58) Field of Classification Search
CPC ........ B01J 2/00; B01J 2/16; B01J 2/20; B01J 8/00; B01J 8/18; B01J 2208/00; B01J 2208/00796; B01J 2208/00823; B01J 2208/0084
See application file for complete search history.

(56) References Cited

U.S. PATENT DOCUMENTS

| 3,982,900 A | 9/1976 | Malgarini et al. |
| 5,145,650 A | 9/1992 | Huttllin |
| 5,147,593 A | 9/1992 | Huttllin |

(Continued)

FOREIGN PATENT DOCUMENTS

| CH | 517037 A | 12/1971 |
| CN | 1549762 A | 11/2004 |

(Continued)

OTHER PUBLICATIONS

EP 1764320 A1 with machine translation (Year: 2007).*

*Primary Examiner* — Natasha E Young
(74) *Attorney, Agent, or Firm* — The Webb Law Firm (57) ABSTRACT

A unit and method for producing granulate as well as an adapter connection piece for connecting a granulator which produces a granulate, and a fluidizing apparatus, wherein the granulates which are produced in the granulator are fluidised by a distributor plate.

19 Claims, 8 Drawing Sheets

(56) References Cited

U.S. PATENT DOCUMENTS

| | | |
|---|---|---|
| 7,329,071 B2 | 2/2008 | Sönnichsen |
| 7,350,318 B2 | 4/2008 | Dachauer et al. |
| 2008/0203200 A1* | 8/2008 | Waldron .................... B01J 2/16 241/25 |
| 2009/0206507 A1 | 8/2009 | Martin et al. |
| 2011/0180157 A1 | 7/2011 | Fusejima et al. |
| 2016/0074827 A1 | 3/2016 | Jacob et al. |
| 2016/0193771 A1 | 7/2016 | Deiss et al. |

FOREIGN PATENT DOCUMENTS

| | | |
|---|---|---|
| CN | 203061148 U | 7/2013 |
| CN | 105531089 A | 4/2016 |
| CN | 206746480 U | 12/2017 |
| DE | 1556091 A1 | 1/1970 |
| DE | 2526738 A1 | 12/1975 |
| DE | 4000572 C1 | 2/1991 |
| DE | 4000571 C1 | 6/1991 |
| DE | 102004038003 A1 | 3/2006 |
| DE | 202010005876 U1 | 8/2011 |
| DE | 102013005921 A1 | 10/2014 |
| DE | 102013102133 B4 | 10/2014 |
| DE | 102014202236 A1 | 8/2015 |
| EP | 1816095 A1 | 8/2007 |
| EP | 2134458 B1 | 9/2010 |
| JP | S53154587 | 12/1978 |
| JP | S61110083 U | 7/1986 |
| JP | H53891 U | 1/1993 |
| JP | H829057 A | 2/1996 |
| JP | 3417669 B2 | 6/2003 |
| JP | 2009506199 A | 2/2009 |
| JP | 201585225 A | 5/2015 |
| WO | 2017163555 A1 | 9/2017 |

\* cited by examiner

UNIT AND METHOD FOR PRODUCING AND TREATING GRANULATE, AND ADAPTER CONNECTION PIECE FOR CONNECTING A GRANULATOR WHICH GENERATES A GRANULATE AND A FLUIDIZING APPARATUS

CROSS-REFERENCE TO RELATED APPLICATIONS

This application is the United States national phase of International Application No. PCT/EP2019/062946, now WO 2019/233746, filed May 20, 2019, and claims priority to German Patent Application No. 10 2018 208 930.22 filed Jun. 6, 2018, the disclosures of which are hereby incorporated by reference in their entirety.

BACKGROUND

Field

The invention relates to a unit for r producing and treating granulate, comprising a granulator which produces the granulate and which is with an outlet for the produced granulate, a fluidizing apparatus which treats the granulate produced by the granulator and is which with an inlet for the granulate to be treated, and an distributor plate through which process air can flow.

The invention furthermore relates to a method for producing and treating granulate, comprising a granulator which produces the granulate and which is with an outlet for the produced granulate, a fluidizing apparatus which treats the granulate produced by the granulator and which is with an inlet for the granulate which is to be treated, and an distributor plate through which process air can flow.

The invention further relates to an adapter connection piece for connecting a granulator which produces a granulate and a fluidizing apparatus, wherein the adapter connection piece which has a longitudinal axis comprises an adapter connection piece housing as well as an inlet and an outlet.

Related Art

The patent document DE 2013 102 133 B4 discloses a fluidised bed dryer for pharmaceutical granulate, with several drying chambers which are arranged annularly about a middle axis and are rotatably mounted about the middle axis, wherein each drying chamber comprises a broken-through base as an air inlet for the drying air, as well as an air outlet, as well as a filling opening and an emptying opening for the granulate, and with a feed air channel which leads the drying air into the drying chamber, as well as an outgoing air channel which leads the drying air which has gotten out of the drying chamber, wherein a filling channel is decentrally arranged in a stationary manner for leading the granulate, in a manner such that each drying chamber with its filling opening can be rotated into a filling position which connects onto the filling channel, and the emptying opening of each drying chamber is likewise arranged in a decentral manner. Hereby, the granulate stream which supplies the drying chamber with granulate is led from the top to the bottom essentially driven by gravity. A filling channel which is connected for example onto an intermediate store serves for the not yet dried granulate blanks being able to get out of this intermediate store via the filling channel and a granulate nozzle into the drying drum. A continuously operating granulation and drying unit with measuring units and methods for the continuous granulation and drying are described in the European patent specification EP 2 134 458 B1. The granulation and drying unit comprises a granulator, for example an extruder, for producing the granulate and a fluidizing apparatus. The granulate which is produced in the granulator is conveyed into the drying unit for post-treatment, either in a gravity-driven manner from the top to the bottom via a transport conduit or through a transport conduit which is subjected to transport air.

Another possibility for conveying the produced granulate out of a granulator into a fluidizing apparatus is represented by a conveying of the produced granulates in a vacuum.

SUMMARY

The disadvantage of the technical solutions for transporting the produced moist granulate from the granulator into the fluidizing apparatus, represented in the state of the art, is the fact that the moist granulate which has a tendency to agglomeration sticks or cakes on the outlet of the granulator, on the inlet of the fluidizing apparatus and/or on the inner wall in the conveying conduit which connects the granulator and the fluidisation unit. By way of this, the outlet of the granulator, the inlet of the fluidizing apparatus and/or the conveying conduit which connects the granulator and the fluidizing apparatus becomes blocked, so that the producing and treatment process in the unit is to be interrupted and the unit cleaned.

It is therefore the object of the present invention to provide a unit and a method for producing and treating granulate, wherein an agglomeration granulate is prevented or at least significantly reduced on transition from the granulator to the fluidizing apparatus.

Given a unit for producing and treating granulate, of the initially mentioned type, this object is achieved by way of the granulator being connected to the inlet of the fluidizing apparatus which is for granulate to be treated, in a manner such that the outlet of the granulator is adjacent to the distributor plate or is arranged above the distributor plate. Advantageously, by way of the invention, an agglomeration of the moist granulate which is produced in the granulator is prevented or at least significantly reduced.

Blockages which are caused by agglomeration of granulates, for example in the outlet of the granulator, in a conveying conduit of the granulate which is designed as an adapter connection piece and/or at the inlet of the fluidizing apparatus are prevented or at least significantly reduced. Hence a process interruption for cleaning the unit, in particular the outlet of the granulator, a conveying conduit of the granulate which is designed as an adapter connection piece, and/or the inlet of the fluidizing apparatus is no longer necessary, said interruption entailing a significant time effort and a high loss of productivity. Such process interruptions are expensive and time-consuming since the complete producing and treatment process for the granulate needs to be terminated and the unit of the producing and treatment process has to be run up again after cleaning.

According to a design which is advantageous inasmuch as this is concerned, the distributor plate is arranged in the fluidizing apparatus or is part of the fluidizing apparatus. This has the advantage that a very compact, space-saving construction manner of the unit is achieved by way of this.

The granulator which produces the granulate is preferably connected to the fluidizing apparatus via an adapter connection piece which has a longitudinal axis, wherein the distributor plate is arranged in the adapter connection piece and possibly additionally in the fluidizing apparatus. An adapter connection piece has the advantage that the connection of the granulator onto the fluidizing apparatus is simpler by way of this.

What is further advantageous is the fact that the distributor plate is designed in a two-part manner, wherein a first part of the distributor plate is arranged in the fluidizing apparatus and a second part of the distributor plate in the adapter connection piece. What is likewise advantageous is the fact that the unit comprises two distributor plates, wherein the first distributor plate is arranged in the fluidizing apparatus and a second distributor plate in the adapter connection piece. By way of this, it is possible to design the first part of the distributor plate which is arranged in the fluidizing apparatus or the first distributor plate in a manner in which it is rotatably about a middle axis of the fluidizing apparatus, so that given a continuous method for producing and treating granulates, a defined retention time for the granulates can be set during the treatment process in the fluidizing apparatus.

Furthermore, the second part of the distributor plate or the second distributor plate is arranged at least partly in the adapter connection piece. Such an arrangement has the advantage that the individual apparatus, specifically the granulator, the adapter connection piece and fluidizing apparatus can be matched or are matched to one another in an optimal manner, for example with regard to an outlet of the granulator which projects into the adapter connection piece.

According to an additional embodiment of the unit according to the invention, the second part of the distributor plate or the second distributor plate subdivides the adapter connection piece at least partly into a first chamber and a second chamber. By way of this subdivision, the produced, moist granulates on leaving the outlet of the granulator are immediately fluidised by process air which flows through the second part of the distributor plate or the second distributor plate and are conveyed in the direction of the fluidizing apparatus. By way of a fluidisation in the adapter connection piece, a pre-treatment of the produced granulates in the adapter connection piece, for example a drying process starts, so that an undesired agglomeration of the granulates is prevented or at least significantly reduced.

Furthermore, process air of the fluidizing apparatus can flow through or flows through the second part of the distributor plate or the second distributor plate, for fluidising granulate in the region of the adapter connection piece. What is advantageous with this technical embodiment of the invention is the fact that by way of this it is possible to also use the process air of the fluidizing apparatus for the fluidisation of the granulate which is conveyed in the adapter connection piece. This further has the advantage that the process parameters which are set for the process air, such as the gas temperature, gas humidity etc. are identical for the first part of the distributor plate which is arranged in the fluidizing apparatus or for the first distributor plate, and for the second part of the distributor plate which is arranged in the adapter connection piece or the second distributor plate. Furthermore, by way of this, apparatus for an onflow of the second part of the distributor plate or for the second distributor plate, said onflow being independent of the fluidizing apparatus, are done away with and hence significant investment costs are saved.

According to a particularly advantageous embodiment of the unit according to the invention, the first part of the distributor plate and the second part of the distributor plate or the first and second distributor plate are designed such that a pressure loss given a flow through the two parts of the distributor plate or the two distributor plates is identical. Such a design of the two parts of the distributor plate or of the two distributor plates has the advantage that the process air immediately fluidises the granulates which enter into the adapter connection piece, since the process air uniformly flows through the complete distributor plate surface.

Particularly preferably, the adapter connection piece comprises a conically designed adapter connection piece housing. An improved onflow of the second part of the distributor plate which arranged in the adapter connection piece, by process air from the fluidizing apparatus is achieved on account of the improved geometry of the run-in stretch region due to the conical design of the adapter connection piece, in particular at the side of the fluidizing apparatus.

According to an additional advantageous embodiment of the unit according to the invention, the second part of the distributor plate or the second distributor plate comprises an at least partly horizontal alignment along the longitudinal axis of the adapter connection piece. Most preferably, the second part of the distributor plate or the second distributor plate is arranged at an angle to the longitudinal axis of the adapter connection piece. On account of an angled arrangement of the second part of the distributor plate which is arranged in the adapter connection piece or of the second distributor plate, in particular with a descent from the granulator to the fluidizing apparatus, an improved transport of the produced granulates from the granulator to the fluidizing apparatus is achieved, since the granulates in the fluidised state accordingly behave as a fluid and accordingly "flow" in the direction of the fluidizing apparatus.

According to an additional advantageous design of the unit according to the invention, a face wall and/or side wall of the second part of the distributor plate or of the second distributor plate comprises a sealing element. By way of this, it is possible to seal the adapter connection piece which comprises a second part of the distributor plate or the second distributor plate, with respect to the apparatus which are connected to this, specifically the fluidizing apparatus and the granulator, in an improved manner.

With regard to this, it is advantageous to seal the side wall of the second part of the distributor plate or of the second distributor plate at least partly with respect to an inner wall of an adapter connection piece housing and/or with respect to an inner wall of the inlet for the granulate into the fluidizing apparatus. With regard to this, it is preferable for the distributor plate of the adapter connection piece to be fixedly connected to the inner wall of the adapter connection piece, i.e. to be impassably connected to the inner wall for process air. Further advantageously, the face wall of the second part of the distributor plate or of the second distributor plate is sealed off at least partly with respect to the first part of the distributor plate which is arranged in the fluidizing apparatus or to the first distributor plate and/or the outlet for the produced granulate.

Preferably, the granulator which produces the granulate is designed as an extruder, particularly preferably as a double-screw extruder. By way of the double-screw extruder, the granulate is produced in a uniform manner and at the same speed, so that the granulates which enter the adapter connection piece are of an optimal nature. Very particularly preferably, the outlet of the granulator is designed as an end of the extruder screw or as ends of the extruder screw.

Concerning a further advantageous embodiment of the unit according to the invention, the first part of the distributor plate which is arranged in the fluidizing apparatus or the first distributor plate which is arranged in the fluidizing apparatus is rotatable about a vertical middle axis of the fluidizing apparatus. By way of this, a continuous producing and treatment process is rendered possible, by which means on the one hand an increase of the production capacity can be achieved or is achieved and on the other hand the retention times of the granulates in the continuous treatment process can be set in a defined manner.

According to a preferred embodiment of the unit according to the invention, the first part of the distributor plate which is arranged in the fluidizing apparatus or the first distributor plate which is arranged in the fluidizing apparatus comprises at least one first and a second distributor disk. With regard to this, the first part of the distributor plate or the first distributor plate of the fluidizing apparatus comprises three distributor disks. By way of such an arrangement of at least two distributor disks which are arranged above one another, on the one hand the pressure loss over the distributor plate can be set in an improved manner by way of a different arrangement to one another and on the other hand the conventional design of an distributor plate is simplified.

Very particularly preferably, one of the distributor disks comprises or forms a sealing element. Most preferred is hereby a variant in which the one distributor disk and the sealing element are designed as two components. By way of the design of a sealing element, in particular of a sealing lip or the like, by way of one of the distributor disks or by way of an arrangement of a sealing element on one of the distributor disks, an optimal and simple possibility of the sealing is achieved, one the one hand between the distributor plate and the outer wall of the fluidizing apparatus and on the other hand between the first part of the distributor plate and or the first distributor plate of the fluidizing apparatus and the second part of the distributor plate or the second distributor plate of the adapter connection piece.

Concerning a method for producing and treating granulate of the initially mentioned type, this object is achieved by way of the granulator being connected to the inlet for the granulate of the fluidizing apparatus which is to be treated, in a manner such that the outlet of the granulator is adjacent to the distributor plate or is arranged above the distributor plate, wherein firstly a granulate is produced by the granulator and subsequently the produced granulate on exit out of the granulator is fluidised by way of the distributor plate which is adjacent to the outlet of the granulator or by way of the distributor plate which is arranged below the outlet of the granulator, so that a treatment of the granulate is effected. Advantageously, by way of this, an agglomeration of the moist granulate which is produced in the granulator is prevented or at least significantly reduced. Blockages which are caused by the agglomeration of granulates, for example in the outlet of the granulator, of a conveying conduit for the granulate, designed as an adapter connection piece and/or at the inlet of the fluidizing apparatus are prevented or at least significantly reduced. Hence a process interruption for the cleaning of the unit, in particular of the outlet of the granulator, of a conveying conduit of the granulate which is designed as an adapter connection piece and/or of the inlet of the fluidizing apparatus, such cleaning entailing a significant effort as well as a high loss of product, is no longer necessary. Such process interruptions are costly and time-consuming since the complete producing and treatment process for the granulate must inevitably be terminated and the unit of the producing and treatment process is to be run up again after the cleaning.

Particularly preferably, the method for producing and treating granulate is a continuous method. By way of a continuous producing and treatment method, the production capacity of the method according to the invention is increased further.

Very particularly preferably, the unit for producing and treating granulate is a unit according to the invention for producing and treating granulate described herein according to the preferred embodiments.

Concerning an adapter connection piece for the connection of a granulator which produces a granulate and of a fluidizing apparatus of the aforementioned type, this object is achieved by way of the adaptor nozzle comprising a distributor plate. By way of the arrangement of an distributor plate in the adapter connection piece which connects the fluidizing apparatus and the granulator, an agglomeration of the moist granulate which is produced in the granulator is advantageously prevented during the conveying procedure into the fluidizing apparatus, so that blockages which are produced by way of agglomerated granulates during the conveying procedure no longer occur. A process interruption for cleaning the unit, in particular the conveying conduit which is designed as an adapter connection piece is no longer necessary, said interruption entailing a significant time effort as well as a product loss. The process interruption is costly and time-consuming, since by way of this the complete producing and treatment process are inevitably terminated and are to be initialised afresh after the cleaning of the unit.

According to an embodiment of the adapter connection piece according to the invention, said embodiment being advantageous in regard to this, the distributor plate of the adapter connection piece is arranged at least partly in the adapter connection piece. Such an arrangement provides the advantage that the individual apparatus, specifically the granulator, the adapter connection piece and the fluidizing apparatus are matchable or matched to one another in an optimal manner, for example with regard to an outlet of the granulator which projects into the adapter connection piece. Particularly preferably, the adapter connection piece comprises a conically designed adapter connection piece housing. By way of the conical design of the adapter connection piece, in particular at the side of the fluidizing apparatus, an improved onflow of the distributor plate with process air from the fluidizing apparatus is achieved on account of an improved geometry of the run-in stretch. Very particularly preferably, the distributor plate of the adapter connection piece comprises an at least partial horizontal alignment along the longitudinal axis of the adapter connection piece. Most preferably, the distributor plate of the adapter connection piece is arranged at an angle to the longitudinal axis of the adapter connection piece. By way of the angled arrangement of the distributor plate, in particular with a descent from the granulator to the fluidizing apparatus, an improved conveying of the produced granulates is achieved, since the granulates in the fluidised state behave in accordance with a fluid and accordingly "flow" in the direction of the fluidizing apparatus.

According to a preferred design of the adapter connection piece according to the invention, a face wall and/or side wall of the distributor plate of the adapter connection piece comprises a sealing element. By way of this, it is possible to seal the adapter connection piece which comprises a second part of the distributor plate or the second distributor plate, with respect to the apparatus which are connected to this, specifically the fluidizing apparatus and the granulator, in an improved manner.

BRIEF DESCRIPTION OF THE DRAWINGS

The invention is hereinafter explained in more detail by way of the accompanying drawings. There are shown in.

DETAILED DESCRIPTION

Figure 1:
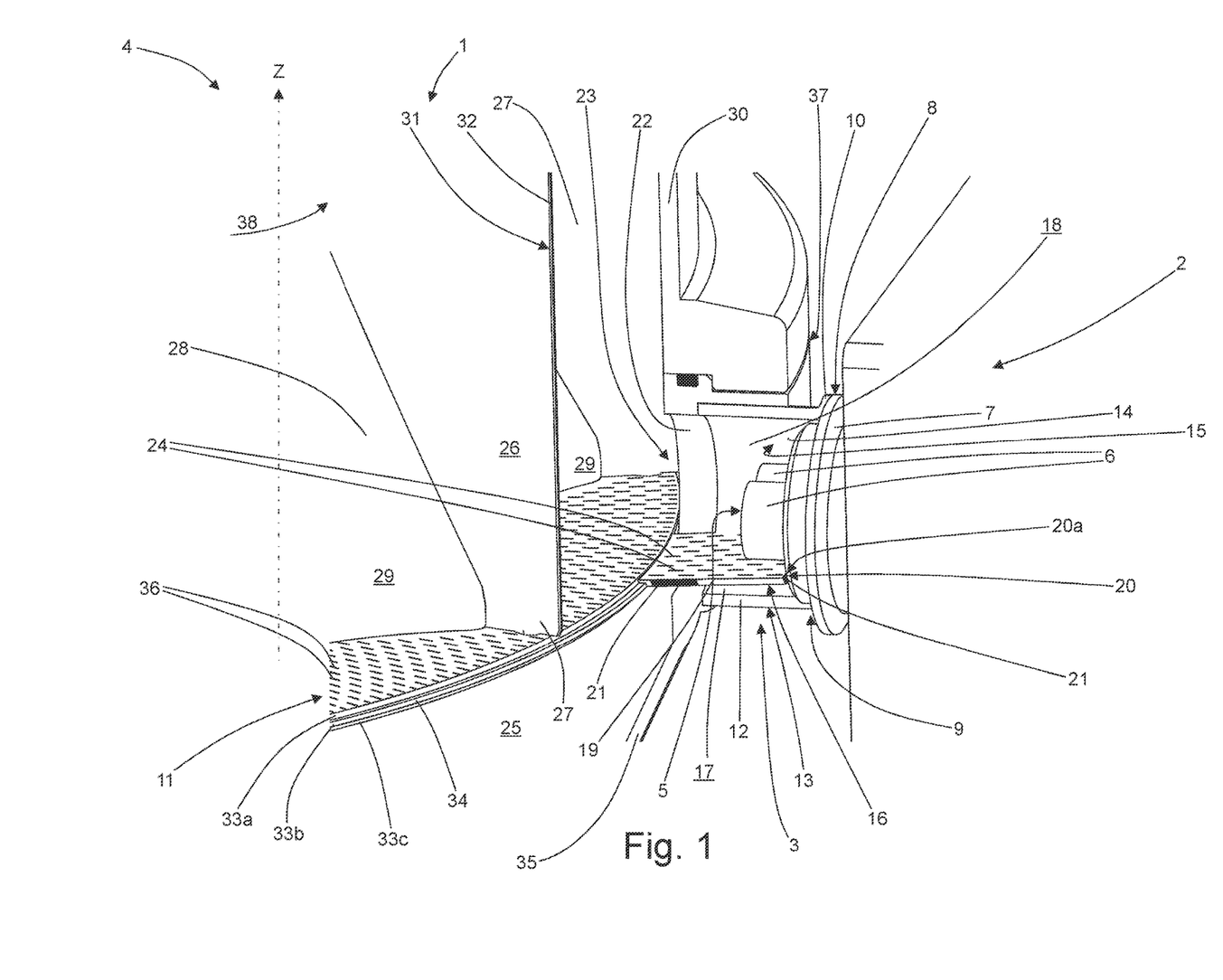
FIG. 1 a perspective representation of an adapter connection piece according to the invention of a first embodiment example of a unit according to the invention, in a part section, said adapter connection piece connecting a fluidizing apparatus and a granulator, FIG. 2 a perspective representation of a first embodiment example of the adapter connection piece according to the invention, in a full section, said adapter connection piece being arranged on the fluidizing apparatuses and having a longitudinal axis A-A, FIG. 3 a lateral view of the first embodiment example of the adapter connection piece according to the invention and according to FIG. 2, in a full section, said adapter connection piece being arranged on the fluidizing apparatus and having a longitudinal axis A-A, FIG. 4 a lateral view of the second embodiment example of the adapter connection piece according to the invention and according to FIG. 2, in a full section, said adapter connection piece being arranged on the fluidizing apparatus and having a longitudinal axis A-A, FIG. 5 a lateral view of the third embodiment example of the adapter connection piece according to the invention and according to FIG. 2, in a full section, said adapter connection piece being arranged on the fluidizing apparatus and having a longitudinal axis A-A, FIG. 6 a perspective representation of a distributor plate of the fluidizing apparatus which comprises three distributor disks, in a part section, FIG. 7 a lateral view of a full section through a distributor plate which comprises three distributor disks, FIG. 8 a perspective representation of the unit according to the invention, wherein the fluidizing apparatus which comprises the adapter connection piece according to the invention and the granulator which produces the granulate are separated from one another, FIG. 9 a perspective representation of the unit according to the invention, wherein the fluidizing apparatus and the granulator which produces the granulator are connected to one another by way of the adapter connection piece according to the invention, FIG. 10 a perspective representation of a second embodiment example of a unit according to the invention, comprising a fluidizing apparatus and a granulator, in a part section and FIG. 11 a schematic representation of the second embodiment example of a unit according to the invention, shown in FIG. 10.

FIG. 1 shows a perspective representation of an adapter connection piece 3 according to the invention, of a first embodiment example of a unit 4 according to the invention, in a part section, said adapter connection piece 3 connecting a fluidizing apparatus 1 and a granulator 2.

In the embodiment example, the granulator 2 which produces the granulate is designed as a double-screw extruder. The granulator 2 comprises an outlet 5. The outlet 5 is designed in the form of two ends 6 of the extruder screw. The granulator 2 comprises a flange 7 for creating a connection 8 to a flange 10 of the adapter connection piece 3 which is arranged on the inlet 9 of the adapter connection piece 3.

The adapter connection piece 3 according to the invention, of the unit 4 according to the invention, is arranged between the fluidizing apparatus 1 which comprises a first distributor plate 11, and the granulator 2, and connects these to one another. Hereby, the adapter connection piece 3 comprises an adapter connection piece housing 13 which is designed from a pipe section 12 and a flange 10 which connects onto this. The adapter connection piece housing 13 comprises an inner wall 15 which has an inner surface 14. A second distributor plate 16 is arranged on the inner surface 14 of the inner wall 15 of the adapter connection piece 3. In the embodiment example, the second distributor plate 16 is arranged at least partly on the inner wall 15 of the adapter connection piece 3, i.e. is fixedly connected to the inner wall 15 of the adapter connection piece 3.

The second distributor plate 16 subdivides the adapter connection piece 3 at least partly into a lower first chamber 17 and an upper second chamber 18. Side walls 19 or face walls 20 which are not fixedly connected to the inner wall 15 of the adapter connection piece 3 can advantageously at least partly comprise a sealing element 21, in particular a sealing lip or the like. In the embodiment example, the face wall 20a which is adjacent to the granulator 2 as well the side walls 19 of the second distributor plate 16 which is arranged in the adapter connection piece 3, said side walls being adjacent in the region of an inner wall 22 of an inlet 23 of the fluidizing apparatus 1, are provided with a sealing element 21.

By way of the sealing elements 21 which are arranged on the second distributor plate 16, the adapter connection piece 3 in a state connected to the fluidizing apparatus 1 and the granulator 2 is sealed off in a manner such that a gaseous medium—also called process air-flows in the adapter connection piece 3 exclusively through the openings 24 of the second distributor plate 16 from the lower first chamber 17 into an upper second chamber 18. The second distributor plate 16 of the adapter connection piece 3 can be designed as a multi-part distributor plate 16, in particular with distributor plate plates which are arranged in a multi-layered manner. In the embodiment example, the second distributor plate 16 of the adapter connection piece 3 is designed as a single-layer, second distributor plate 16.

The second distributor plate 16, as is represented in the embodiment example, is preferably arranged at an angle α to the longitudinal axis A-A of the adapter connection piece 3. Hereby, the angle x is selected in a manner such that a descent arises from the granulator 2 to the inlet 23 of the fluidizing apparatus 1. By way of this, the granulates which are fluidised by the second distributor plate 16 in the adapter connection piece 3 according to the invention and which in the fluidised state behave as a fluid "flow" from the granulator 2 into the fluidizing apparatus 1.

In the embodiment example, the fluidizing apparatus 1 comprises a distribution chamber 25 and a vortex chamber 26, wherein the distribution chamber 25 and the vortex chamber 26 are separated from one another by a first distributor plate 11. Process air which enters the distribution chamber 25 via an entry opening for the process air, said entry opening not being represented, is distributed, in particular in a uniform manner via the first distributor plate 11 onto the vortex chamber 26 and flows through the first distributor plate 11 as well as the second distributor plate 16 which is arranged in the adapter connection piece 3, in the direction of the vortex chamber 26. The process air is brought out of the fluidizing apparatus 1 in an upper section of this which is not shown, and firstly is preferably purified via a filter which is not represented.

The vortex chamber 26 comprises a displacement body 28 which comprises separating walls 27. The vortex chamber 26 is subdivided into process chambers 29 by the separating walls 27. The separating walls 27 extend from the displacement body 28 up to a side wall 30 of the vortex chamber 26.

Furthermore, the separating walls 27 comprise a sealing element 32, in particular in the form of a sealing lip, which is arranged on its outer end 31. By way of this, the process chambers 29 are separated from one another, so that no granulate gets from a process chamber 29 into another process chamber 29. The separating walls 27 moreover extend in a manner coming from the distributor plate 11 at an arbitrary height in the direction of a vertical middle axis Z of the fluidizing apparatus 1. The height of the separating walls 27 can be changed or adapted and in particular is dependent on the granulate which is to be treated.

The first distributor plate 11 of the fluidizing apparatus 1 in the embodiment example comprises an upper distributor disk 33a, a middle distributor disk 33b and a lower distributor disk 33c. Hereby, preferably the middle distributor disk 33b comprises a sealing element 34, in particular a sealing lip or the like, which is peripheral around the first distributor plate, or itself forms such a sealing element 34. The middle distributor disk 33b is preferably manufactured of polytetrafluoroethylene (PTFE). In the embodiment example, the sealing element 34 of the first distributor plate 11 of the fluidizing apparatus 1, in particular seals one of the distributor disks 33a to 33c with respect to the side wall 35 of the distribution chamber 25b. In the region of the inlet 23 of the fluidizing apparatus 1, the sealing element 34 of the first distributor plate 11 seals with respect to the second distributor plate 16 of the adapter connection piece 3. The individual distributor disks 33a, 33b and 33c comprise openings 36a, 36b and 36c. The openings 36a to 36c are designed in a manner such that these produce a pressure loss of the process air over the two distributor plates 11, 16, wherein this pressure loss can be set and adjusted such that granulates which are located in the process chamber 29 are always fluidised, i.e. a fluidisation take place in each process chamber 29. By way of this, it is ensured that the gaseous medium, the process air, flows via the distribution chamber 25 through the openings 24 of the second distributor plate 16 which is arranged in the adapter connection piece 3 or through the openings 36 of the first distributor plate 11 of the fluidizing apparatus 1 into the vortex chamber 26 and fluidises the granulates there.

The adapter connection piece 3 is arranged at the inlet 23 of the fluidizing apparatus 1. The inlet 23 for the granulate which is to be treated is hereby arranged in a side wall 35 of the distribution chamber 25. The inlet 23 of the fluidizing apparatus 1 is arranged in a side wall 35 of the fluidizing apparatus 1 in a manner such that the inlet 23 comprises a connection each to the distribution chamber 25 and to the vortex chamber 26. The side wall 35 of the distribution chamber 25 in the embodiment example is connected to the side wall 30 of the vortex chamber 26 via a connection 37, in particular a flange connection.

On operation of the unit 4 according to the invention, in a first step the granulate is manufactured in the granulator 2 by way of spraying or another type of addition of in particular binder fluid with pulverous material, in particular particles, and simultaneous mixing.

The granulate which is produced in the granulator 2 subsequently enters the upper second chamber 18 of the adapter connection piece 3 via the two ends 6 of the granulator 2 in the form of a double-screw extruder. There, the produced moist granulate on entry into the upper second chamber 18 of the adapter connection piece 3 is fluidised by the process air which flows through the second distributor plate 16 which is arranged in the adapter connection piece 3. In the fluidised state, the granulates behave as a fluid and on account of the gradient which is at an angle α to the longitudinal axis A-A "flow" from the granulator 2 to the inlet 23 of the fluidizing apparatus 1 and to the first distributor plate 11 which is arranged in the fluidizing apparatus 1. By way of this, the produced moist granulates are at least partly dried, by which means an agglomeration of the granulates at the outlet 5 of the granulator 2, in the adapter connection piece 3 and on the inlet 23 of the fluidizing apparatus 1 is prevented or significantly reduced.

The first distributor plate 11 which is arranged on the displacement body 28 and its separating walls 27 rotates in the rotation direction 38 about a middle axis Z of the fluidizing apparatus 1. By way of this, the granulates get from the granulator 2 via the adapter connection piece 3 into a process chamber 29 of the fluidizing apparatus 1. There, the granulates are treated in the fluidised state. The granulates can be sprayed with different fluids, emulsions, suspensions, or the like, and hence be post-treated, by way of nozzles which are arranged in the fluidizing apparatus 1 and which are not represented here. The granulates are always treated in an equal and optimal manner with a constant retention time due to the constant rotation speed of the process chambers 29 of the fluidizing apparatus 1 and are subsequently brought out of the fluidizing apparatus 1 via an outlet of the fluidizing apparatus 1 which is not represented.

The first and the second distributor plate 11, 16 can also be designed as a first part 11 of a distributor plate and a second part 16 of a distributor plate. Preferably, given such a design of the distributor plate, both parts 11, 16 of the distributor plate are identical, i.e. for example are of the same material with an equal number of distributor disks 33 and with an equal cross section of the openings 24, 36. The first and second distributor plate 11, 16 can also be designed identically.

Figure 2:
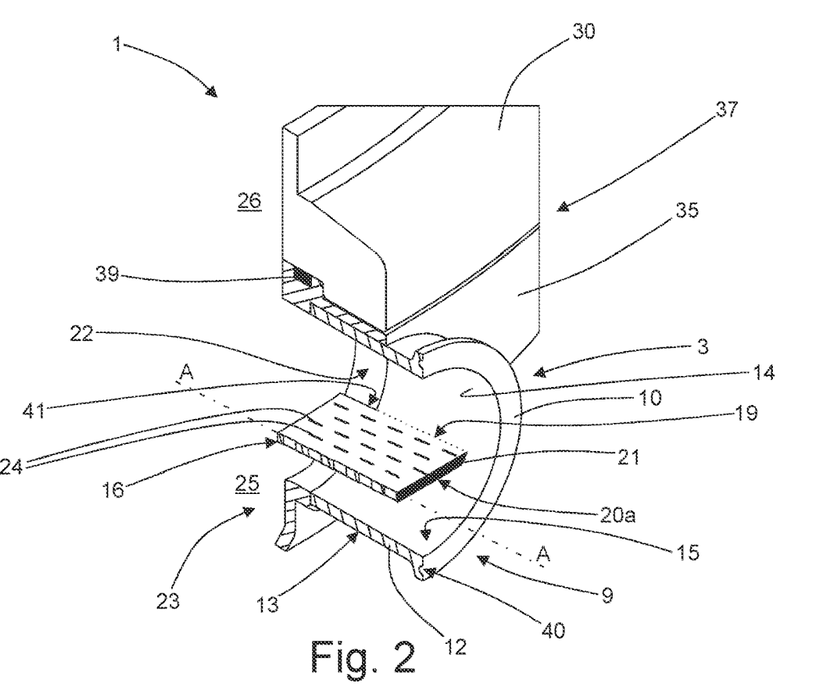

FIG. 2 represents a perspective representation of a first embodiment example of the adapter connection piece 3 according to the invention in a full section, said adapter connection piece being arranged on the fluidizing apparatus 1 and having a longitudinal axis A-A. The section is made along a vertical plane through the longitudinal axis A-A of the adapter connection piece 3. The adapter connection piece 3 is arranged at the inlet 23 of the fluidizing apparatus 1 in the side wall 35 of the distribution chamber 25. The side wall 35 of the distribution chamber 25 is connected to the side wall 30 of the vortex chamber 26 by way of a connection 37, in particular a flange connection, wherein a sealing element 39 is arranged between the two side walls 30, 35. The first distributor plate 11 which separates the distribution chamber 25 and the vortex chamber 26 from one another and is arranged in the fluidizing apparatus 1 is not represented in FIG. 2.

The adapter connection piece 3 comprises an adapter connection piece housing 13 with a pipe section 12 and with a flange 10 of the adapter connection piece 3 which is arranged on the pipe section 12. The adapter connection piece 3 is connectable to a flange 7 which is arranged on the granulator 2 and is not shown here, by way of the flange 10 at the inlet 9 of the adapter connection piece 3. A sealing element which is not represented, in particular an annular seal or a flat seal or the like is arranged in the groove 40 of the flange 10 for sealing the flanges 7, 10.

The second distributor plate 16 which comprises the openings 24 and is designed in a single-layered manner is partly arranged in the adapter connection piece 3. Hereby, the side walls 19 of the second distributor plate 16 are fixedly connected at least partly to the inner surface 14 of the inner wall 15 of the adapter connection piece housing 13. This connection is represented by way of the dashed line which is shown there in FIG. 2. The section 41 of the side wall 19 of the second distributor plate 16, said section being arranged in the region of the inner wall 22 of the inlet 23, is sealed with respect to the inner wall 22 of the inlet 23 of the fluidizing apparatus 1 by a sealing element 21 which is not shown. For sealing the second distributor plate 16 which is partly arranged in the adapter connection piece 3, with respect to the non-shown granulator 2, the seal is arranged on the face wall 20a.

Figure 3:
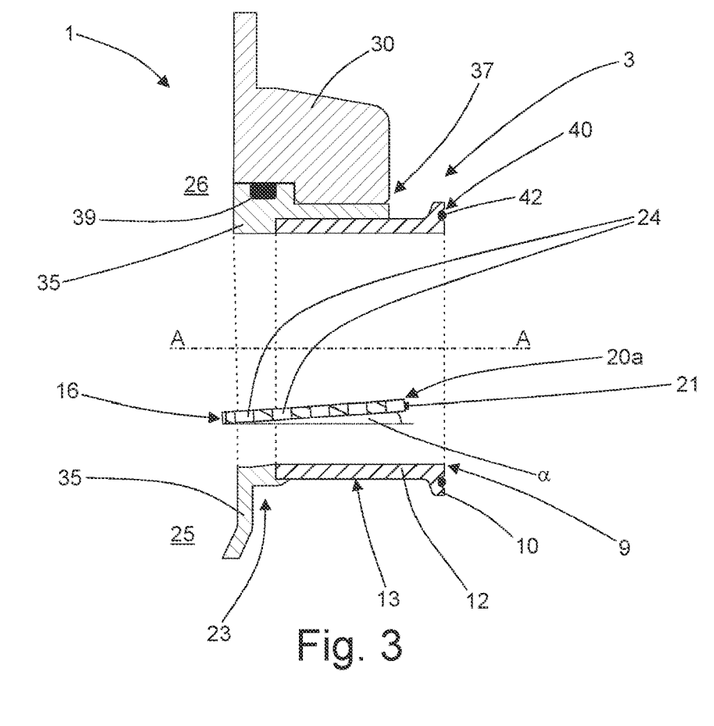

A lateral view of the first embodiment example of the adapter connection piece 3 according to the invention and according to FIG. 2, said adapter connection piece being arranged on the fluidizing apparatus 1 and having a longitudinal axis A-A, is shown in a full section in FIG. 3. The adapter connection piece 3 is arranged at the inlet 23 of the fluidizing apparatus 1 in the side wall 35 of the distribution chamber 25. The side wall 35 of the distribution chamber 25 is connected to the side wall 30 of the vortex chamber 26 via the connection 37 which comprises a sealing element 39.

Furthermore, in FIG. 3 it is shown that the second distributor plate 16 of the adapter connection piece 3 which is designed in a single-layer or single-ply manner and comprises openings 24 is arranged along the longitudinal axis A-A of the adapter connection piece 3 at an angle α to this. The distributor plate 16 at one side of the fluidizing apparatus 1 projects out of the adapter connection piece 3 and in the embodiment example slightly into the fluidizing apparatus. On account of the angle α with respect to the longitudinal axis A-A of the adapter connection piece 3, the second distributor plate 16 has a descent from the inlet 9 of the adapter connection piece 3 in the direction of the inlet 23 of the fluidizing apparatus 1. Furthermore, the second distributor plate 16 does not extend through the complete adapter connection piece 3 but ends in this after about ¾ of the length of the adapter connection piece 3.

A sealing element 21, in particular in the form of a sealing lip or the like is arranged on the face wall 20a of the second distributor plate 16 of the adapter connection piece 3, said sealing element sealing between the second distributor plate 16 and the granulator 2 which is not represented here. Furthermore, a sealing element 42, preferably a ring seal, for example an O-ring is arranged in the groove 40 of the adapter connection piece housing 13 which connects onto the pipe section 12 of the flange 10.

Figure 4:
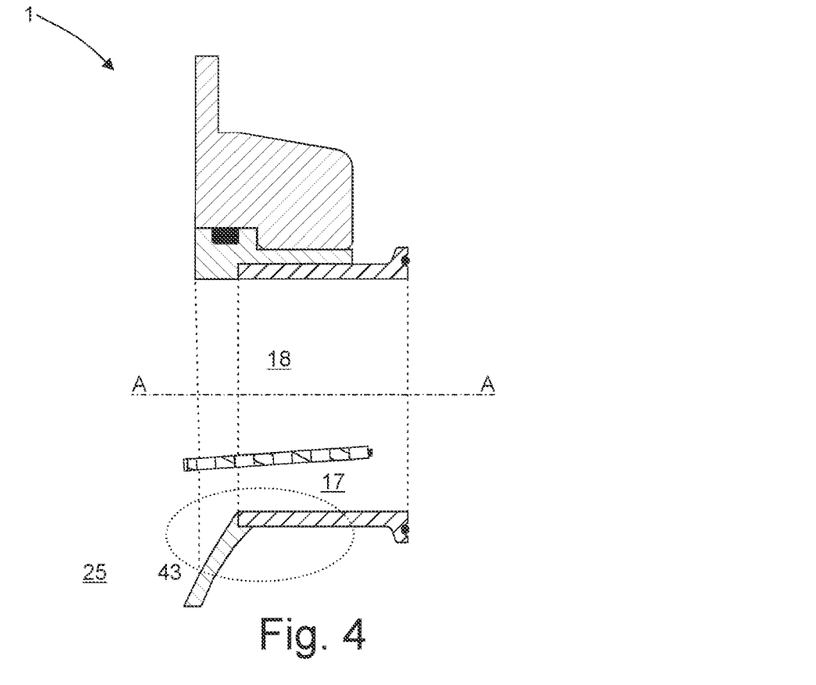
Figure 5:
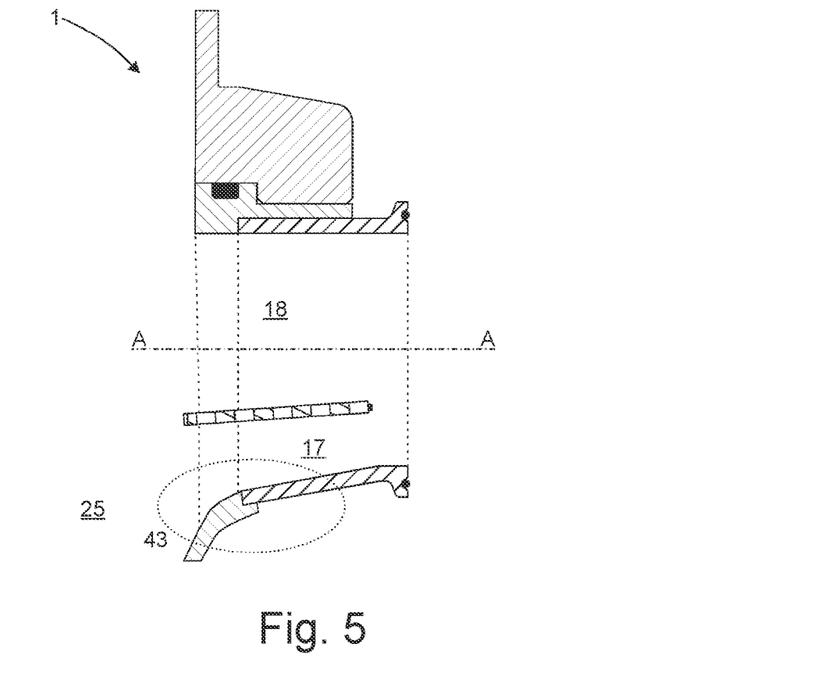

The two FIGS. 4 and 5 show a lateral view of a second and third embodiment example respectively, of the adapter connection piece 3 according to the invention and according to FIG. 2, in a complete section, said adapter connection piece being arranged on the fluidizing apparatus 1 and comprising a longitudinal axis A-A.

In comparison to the first embodiment example of the adapter connection piece 3 according to the invention which is shown in FIGS. 2 and 3, the second and third embodiment example comprise a changed optimised run-in stretch region 44 for process air which flows out of the distribution chamber 25 of the fluidizing apparatus 1 into the lower, first chamber 17. The optimised run-in stretch region 44 leads to an improved fluidisation of the granulates which enter the upper second chamber 18 from the outlet 5 of the granulator 2 which is not shown.

Figure 6:
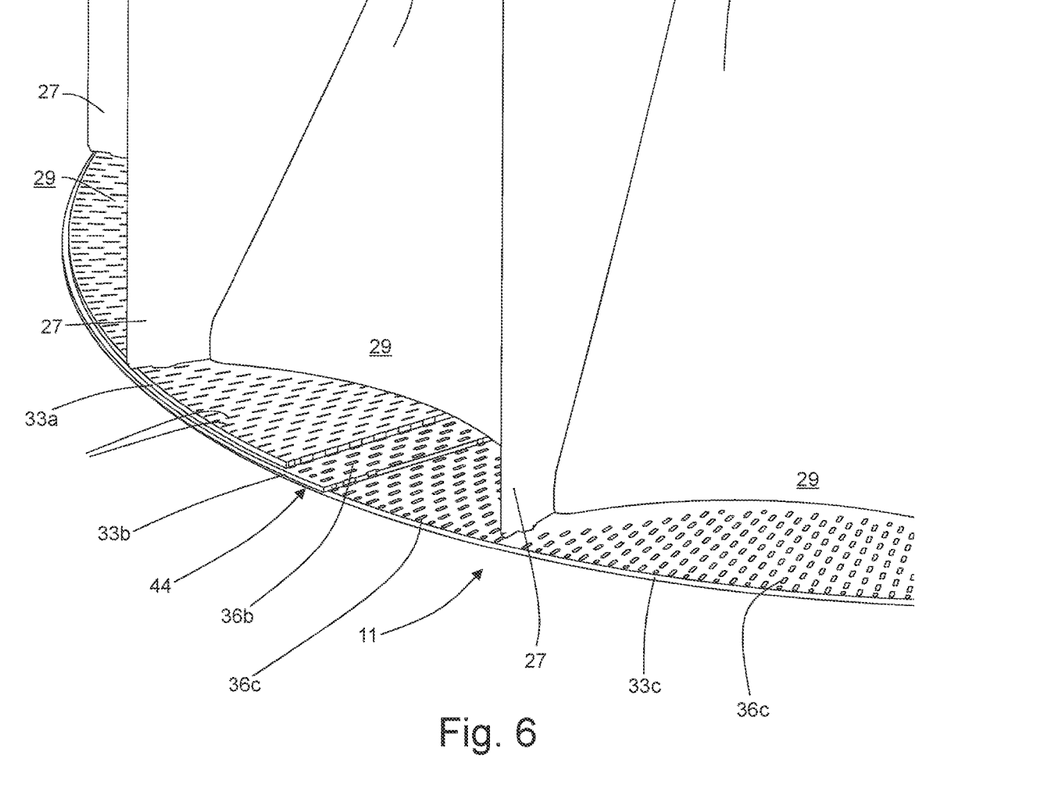

A perspective representation of a first distributor plate 11 of the fluidizing apparatus 1 which comprises three distributor disks 33a to 33c is represented in FIG. 6 in a part section. The first distributor plate 11 which comprises three distributor disks 33a to 33c is arranged on the displacement body 28 of the fluidizing apparatus 1 which comprises separating walls 27. The vortex chamber 26 of the fluidizing apparatus 1 is subdivided into process chambers 29 by way of the separating walls 27.

The three distributor disks 33a to 33c of the first distributor plate 11 have not been represented in a continuous manner in FIG. 6 for the purpose of a simplified representation. The lower distributor disk 33c in the embodiment example comprises openings 36c which correspond to the openings 36b of the middle distributor disk 33b. The lower distributor disk 33c has the function of holding and stabilising the middle distributor disk 33b which is designed as a sealing base. The lower distributor disk 33c as with the upper distributor disk 33a is preferably manufactured of steel, in particular stainless steel. The distributor disk 33b which is designed as a sealing g base is preferably manufactured of polytetrafluoroethylene (PTFE). In order for the middle distributor disk 33b to be useable as a sealing base, this must either have a diameter which is larger in comparison to the lower and upper distributor disk 33 and 33b respectively or have a non-represented sealing element 34 at its outer end 44. In the embodiment example, the middle distributor disk 33b on account of its larger diameter in comparison to the distributor disks 33a and 33c itself forms the sealing element 34 at its outer end 44.

The upper distributor disk 33a of the first distributor plate 11 which is arranged in the fluidizing apparatus 1, in the preferred embodiment which is represented in the embodiment example comprises smaller openings 36a, in particular in a slotted shape with a width of 0.2 mm. The pressure loss which is produced over the first distributor plate 11 is set by way of the openings 36a to 36c of the distributor disks 33a to 33c, in particular by way of the upper distributor disk 36a. Given an optimal setting of the pressure loss which is produced over the first distributor plate 11, the granulate which is to be treated is fluidised in an optimal manner, i.e. the process air also fluidises the produced, moist granulate which enters the process chamber 29.

By way of such a design of the first distributor plate 11 which is arranged in the fluidizing apparatus, in particular by way of the middle distributor disk 33b which is designed as a seal base, this can be rotated in the fluidizing apparatus 1 about a middle axis Z and simultaneously without the display of appearances of wearing can seal the distribution chamber 25 from the vortex chamber 26 as well as seal the second distributor plate 16 which is arranged in the adapter connection piece 3 with respect to the first distributor plate 11.

Figure 7:
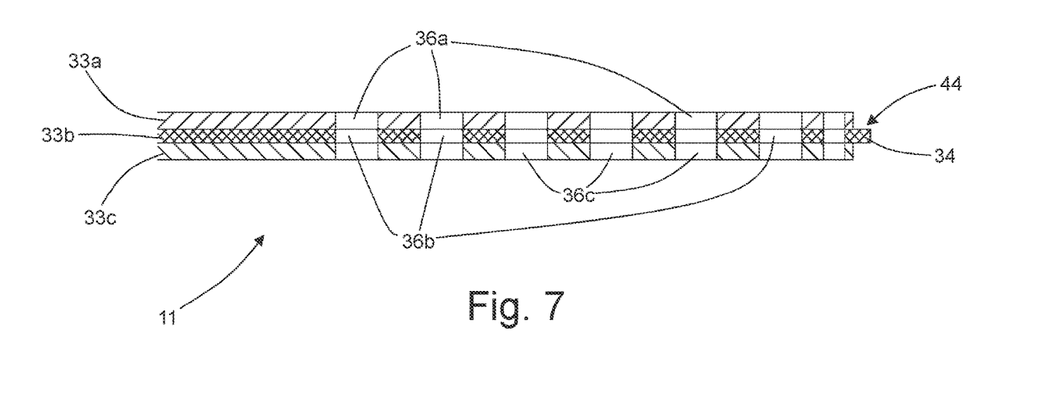

FIG. 7 shows a lateral view of a full section through a first distributor plate 11 which comprises three distributor disks 33a to 33c and is arranged in the fluidizing apparatus 1. The middle distributor disk 33b has a larger diameter compared to the upper and the lower distributor disk 33a and 33c. In the represented embodiment example, the middle distributor disk 33b by way of this forms a sealing element 34 at its outer end 43.

The openings 36a to 36c of the distributor disks 33a to 33c are arranged above one another in the embodiment example, wherein according to FIG. 6 the openings 36a of the distributor disk 33a have a width which is not shown here and which is smaller in comparison to the openings 36b and 36c.

Figure 8:
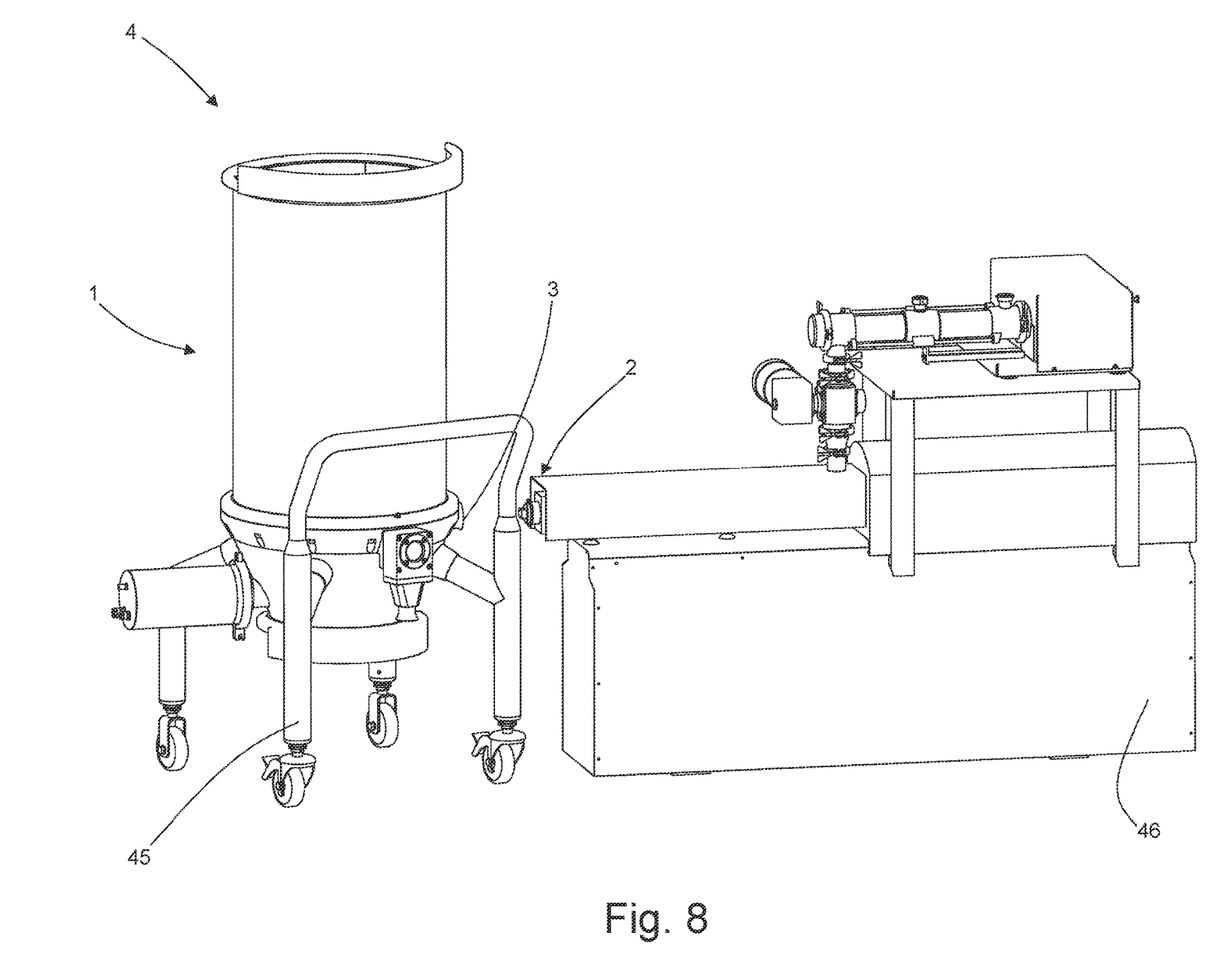

A perspective representation of the unit 4 according to the invention is represented in FIG. 8, wherein the fluidizing apparatus 1 which comprises the adapter connection piece 3 according to the invention and the granulator 2 which produces the granulate are separated from one another. The fluidizing apparatus 1 which is arranged on a traversable mount 45 and which comprises the adapter connection piece 3 according to the invention, in the embodiment example of FIG. 8 is decoupled from the granulator 2 which is designed as a double-screw conveyor and which is arranged on a base mount 46.

Figure 9:
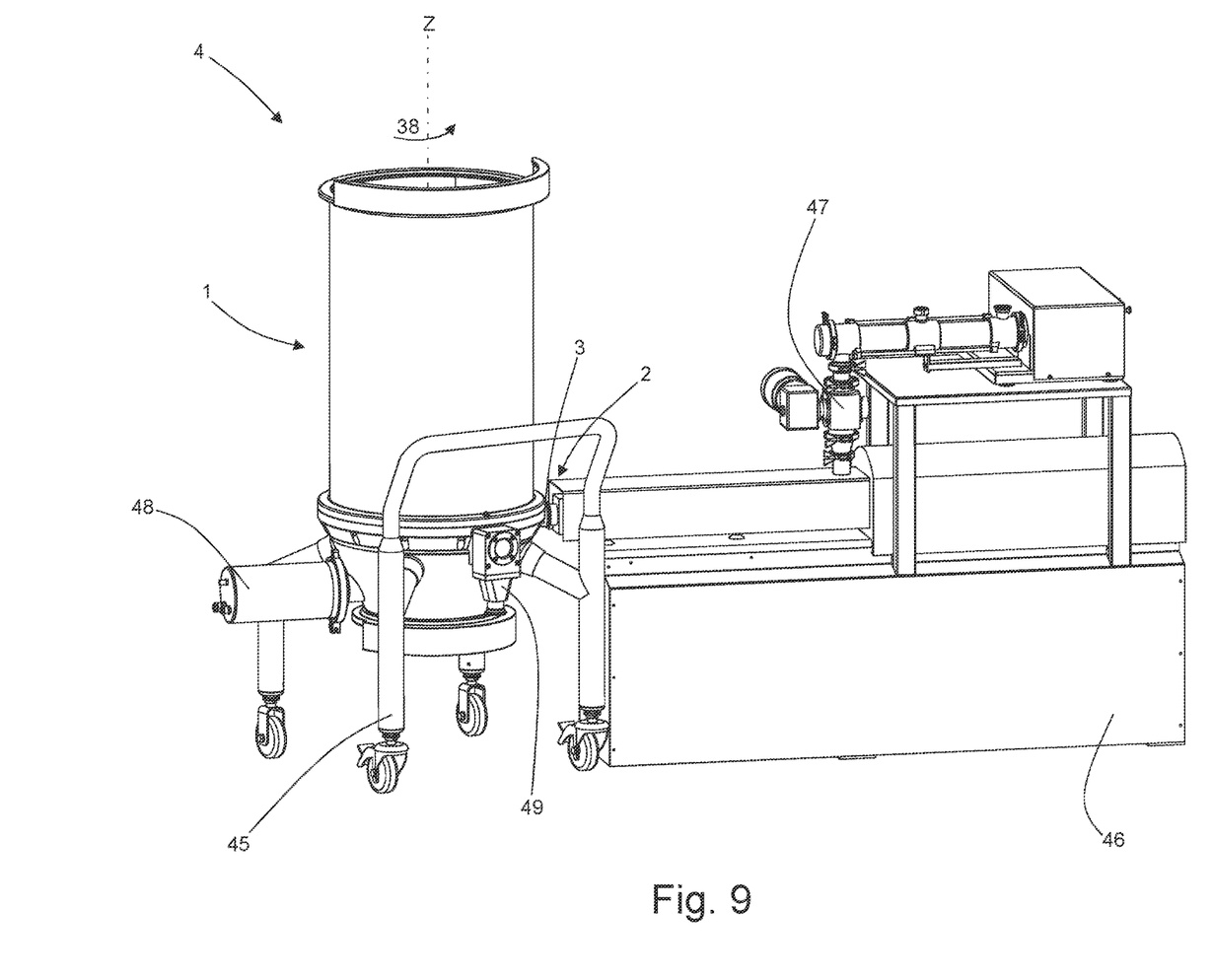

A perspective representation of the unit 4 according to the invention is shown in FIG. 9, wherein the fluidizing apparatus 1 and the granulator 2 which produces the granulate are connected to one another by way of the adapter connection piece 3 according to the invention. The fluidizing apparatus 1 which is arranged on the traversable mount 45 and comprises the adapter connection piece 3 according to the invention, in the embodiment example of FIG. 9 is connected to the granulator 2 which is designed as a double-screw extruder. There is the possibility of assembling the granulator 2 on the base mount 46 for a simple assembly as well as for cleaning and maintenance purposes, wherein the base mount 46 comprises a linear displacing unit for displacing the granulator 2, so that the granulator 2 is displaced by way of the linear displacing unit for coupling the fluidizing apparatus 1 and the granulator 2 of the unit according to the invention. In the embodiment example, the granulator 2 has been displaced in the direction of the fluidizing apparatus 1 by way of the linear displacing unit and is therefore connected to this fluidizing apparatus.

The particle-like material which enters into the granulator 2 via feed conduits 47 is mixed with binding fluid in the granulator and the granulate forms. The granulate which exits the granulator 2 is fluidised in the adapter connection piece 3 and by way of this is transported into the fluidizing apparatus 1. There, the granulate is treated in the process chamber 29 which is not represented. In the embodiment example, the non-represented process chambers 29 rotate in the rotation direction 38 about the middle axis Z. Hereby, the displacement body 28 which comprises the separating walls 27, together with the first distributor plate 11 is driven by a motor 48 which comprises a gear, preferably an electric motor, servomotor or torque motor. The motor 48 preferably has a constant torque over its complete speed range. By way of this, the retention time of the granulate on the fluidizing apparatus is set in a defined manner until the treated granulate is brought out of the unit 4 at the outlet 49 of the fluidizing apparatus 1.

Figure 10:
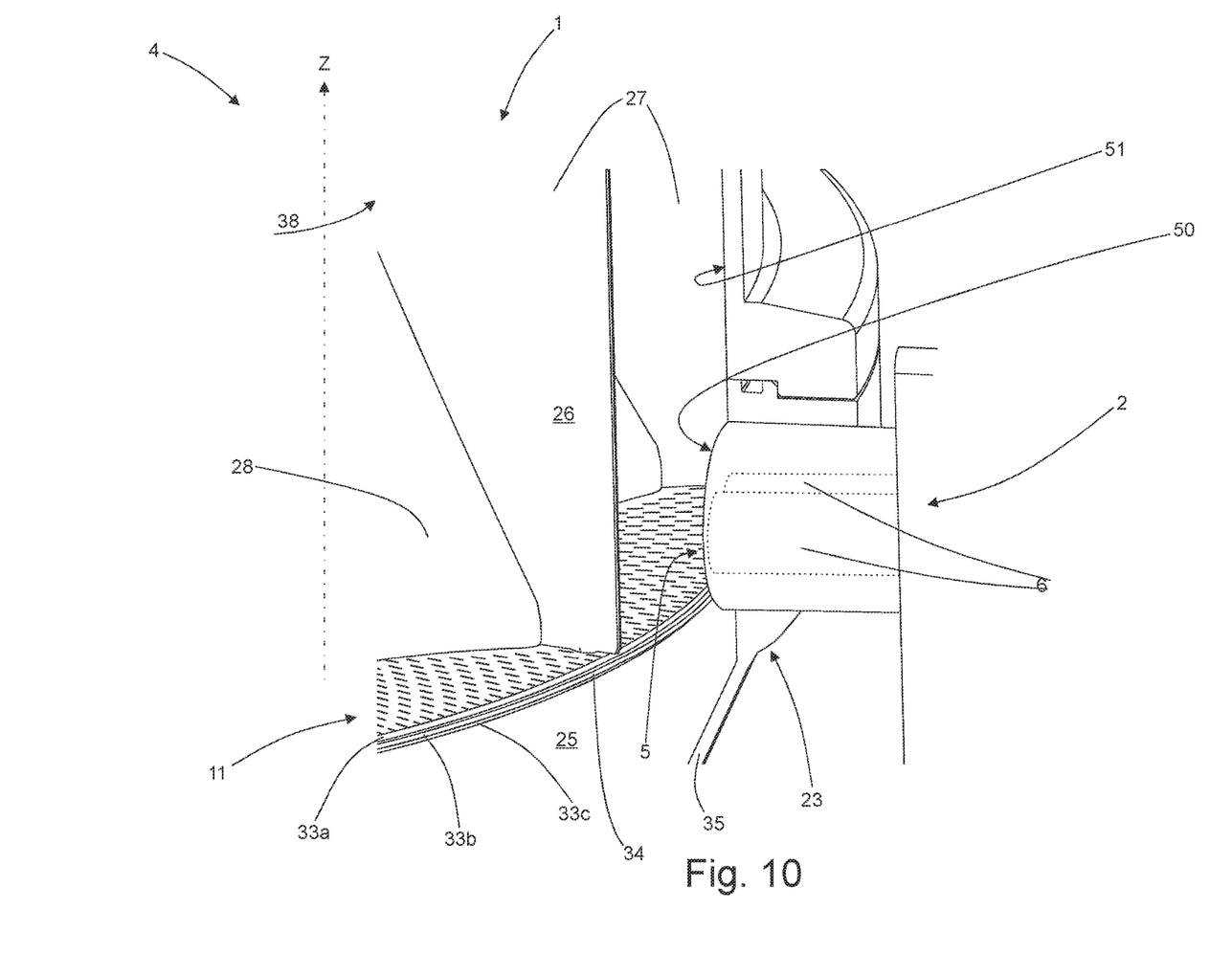

FIG. 10 represents a perspective representation of a second embodiment example of a unit 4 according to the invention, comprising a fluidizing apparatus 1 and a granulator 2, in a part section. In contrast to the first embodiment example of the unit 4 according to the invention and according to FIG. 1, the second embodiment example of the unit 4 according to the invention has no adapter pipe stub 3. The granulator 2 is arranged on the fluidizing apparatus 1 in a direct manner, i.e. without a connection part, such as an adapter pipe stub 3.

The fluidizing apparatus 1 comprises a vortex chamber 26 which is separated from the distribution chamber 25 by way of a distributor plate 11. Hereby, the distributor plate 11 is designed in a three-layered manner and comprises distributor disks 33a to 33c. The distributor disk 33b which has a larger diameter compared to the distributor disks 33a and 33c seals between the distribution chamber 25 and the vortex chamber 26 with respect to a side wall 35 of the distribution chamber 25 as well as with respect to the outlet 5 of the granulator 2 by way of the sealing element 34 which is formed by the distributor disk 33b itself.

Furthermore, on operation of the unit 4 according to the invention, the distributor plate 11 which is arranged in the fluidizing apparatus 1 on the displacement body 28 and on the separating walls 27 is rotated in the rotation direction 38 about the middle axis Z.

The granulator 2 in the embodiment example is designed as a double-screw extruder and comprises an outlet 5 for the produced, moist granulate in the form of two ends 6 of the extruder screws. The granulator 2 is connected to the fluidizing apparatus 1 in a manner such that the outlet 5 of the granulator 2 is directly adjacent to the distributor plate 11 which is arranged in the fluidizing apparatus 1. Hereby, advantageously a face wall 50 of the outlet 5 of the granulator 2, with regard to its design, for example radius and curvature, corresponds to an inner wall 51 of the fluidizing apparatus 1. A continuous operation is ensured by way of this since the separating walls 27 can rotate past the outlet 5 of the granulator 2.

Advantageously, by way of this, an agglomeration of the moist granulate which is produced in the granulator 2 is prevented or at least significantly reduced. Blockages, which are caused by the agglomeration of granulates, for example in the outlet of the granulator 2 and/or on the inlet 23 of the fluidizing apparatus 1 are prevented or at least significantly reduced, since the granulates which exit the granulator 2 are immediately fluidised on entry into the fluidizing apparatus 1 and are treated in the fluidizing apparatus 1.

Figure 11:
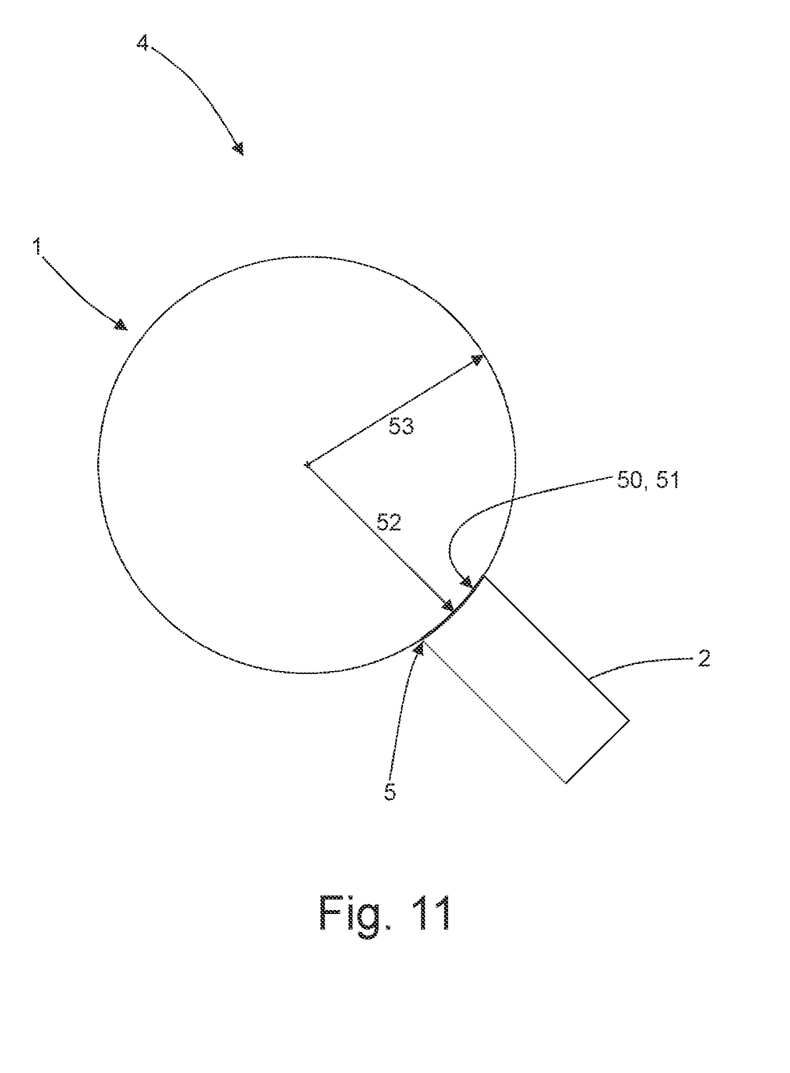

A schematic representation of the second embodiment example of a unit 4 according to the invention which is shown in FIG. 10 is represented in FIG. 11. The inner wall 51 of the fluidizing apparatus 1 of the unit 4 according to the invention, which with regard to its design (represented as a bold line in FIG. 11) corresponds to the face wall 50 of the outlet 5 of the granulator 2, in its radius 53 is identical to the curvature of the face wall 50 with the radius 52, so that the ends 6 of the extruder screws which form the outlet 5 do not project into the vortex chamber 26.

The invention claimed is:

1. A unit for producing and treating granulate, comprising:
   (a) a granulator which produces the granulate and includes an outlet for the produced granulate,
   (b) a fluidizing apparatus, which treats the granulate produced by the granulator and includes an inlet for the granulate to be treated,
   (c) a distributor plate through which process air can flow, wherein the granulator is connected to the inlet for the granulate of the fluidizing apparatus which is to be treated in a manner such that the outlet of the granulator is adjacent to the distributor plate or is arranged above the distributor plate,
   wherein the granulator which produces the granulate is connected to the fluidizing apparatus via an adapter connection piece which has a longitudinal axis A-A, wherein the distributor plate is arranged in the adapter connection piece and in the fluidizing apparatus.

2. The unit according to claim 1, wherein the distributor plate is arranged in the fluidizing apparatus or is part of the fluidizing apparatus.

3. The unit according to claim 1, wherein the distributor plate is designed in a two-part manner, wherein a first part of the distributor plate is arranged in the fluidizing apparatus and a second part of the distributor plate is arranged in the adapter connection piece.

4. The unit according to claim 3, wherein the second part of the distributor plate at least partly subdivides the adapter connection piece into a first chamber and a second chamber.

5. The unit according to claim 3, wherein process air of the fluidizing apparatus can flow through the second part of the distributor plate for fluidising granulate in the region of the adapter connection piece.

6. The unit according to claim 3, wherein the first part of the distributor plate and the second part of the distributor plate are designed in a manner such that a pressure loss given a flow through the two parts of the distributor plate is identical.

7. The unit according to claim 3, wherein the second part of the distributor plate is arranged at an angle to the longitudinal axis A-A of the adapter connection piece.

8. The unit according to claim 3, wherein a face wall and/or side wall of the second part of the distributor plate comprises a sealing element.

9. The unit according to claim 1, wherein the granulator which produces the granulate is designed as an extruder.

10. The unit according to claim 9, wherein the outlet of the granulator is designed as an end of an extruder screw or as ends of the extruder screw.

11. The unit according to claim 3, wherein the first part of the distributor plate which is arranged in the fluidizing apparatus is rotatable about a vertical middle axis of the fluidizing apparatus.

12. The unit according to claim 3, wherein the first part of the distributor plate which is arranged in the fluidizing apparatus comprises at least a first and a second distributor disk.

13. The unit according to claim 12, wherein the first part of the distributor plate comprises three distributor disks.

14. The unit according to claim 12, wherein one of the distributor disks comprises or forms a sealing element.

15. A method for producing and treating granulate using a unit, the unit comprising:
 (a) a granulator which produces the granulate and includes an outlet for the produced granulate,
 (b) a fluidizing apparatus which treats the granulate produced by the granulator and includes an inlet for the granulate to be treated,
 (c) a distributor plate through which process air can flow,
 wherein the granulator is connected to the inlet for the granulate of the fluidizing apparatus which is to be treated in a manner such that the outlet of the granulator is adjacent to the distributor plate or is arranged above the distributor plate, and
 wherein the granulator which produces the granulate is connected to the fluidizing apparatus via an adapter connection piece which has a longitudinal axis A-A, wherein the distributor plate is arranged in the adapter connection piece and in the fluidizing apparatus,
 the method comprising:
 firstly a granulate is produced by the granulator and subsequently the produced granulate on exit out of the granulator is fluidised by way of the distributor plate which is adjacent to the outlet of the granulator or by way of the distributor plate which is arranged below the outlet of the granulator, so that a treatment of the granulate is effected.

16. The method according to claim 15, wherein the method for producing and treating granulate is a continuous method.

17. An adapter connection piece for the connection of a granulator which produces a granulate, and a fluidizing apparatus, apparatus, wherein the adapter connection piece comprises: a longitudinal axis A-A; an adapter connection piece housing; an inlet; an outlet; and a distributor plate.

18. The adapter connection piece according to claim 17, wherein the distributor plate of the adapter connection piece is at least partly arranged in the adapter connection piece.

19. The adapter connection piece according to claim 17, wherein a face wall and/or side wall of the distributor plate of the adapter connection piece comprises a sealing element.

* * * * *

UNITED STATES PATENT AND TRADEMARK OFFICE
CERTIFICATE OF CORRECTION

PATENT NO. : 12,145,126 B2  
APPLICATION NO. : 16/972098  
DATED : November 19, 2024  
INVENTOR(S) : Jochen Thies et al.

Page 1 of 1

It is certified that error appears in the above-identified patent and that said Letters Patent is hereby corrected as shown below:

In the Specification

Column 1, Line 14, delete "930.22" and insert -- 930.2 --

In the Claims

Column 16, Line 27, Claim 17, delete "apparatus, apparatus," and insert -- apparatus, --

Signed and Sealed this  
Eleventh Day of February, 2025

Coke Morgan Stewart  
*Acting Director of the United States Patent and Trademark Office*